United States Patent
Falcone et al.

(10) Patent No.: US 6,379,801 B1
(45) Date of Patent: Apr. 30, 2002

(54) SILANE DERIVATIZED LUBRICANTS FOR MAGNETIC RECORDING MEDIA

(75) Inventors: Samuel J. Falcone; Michael J. Stirniman, both of San Jose, CA (US)

(73) Assignee: Seagate Technology, LLC, Scotts Valley, CA (US)

(*) Notice: Subject to any disclaimer, the term of this patent is extended or adjusted under 35 U.S.C. 154(b) by 0 days.

(21) Appl. No.: 09/455,468

(22) Filed: Dec. 6, 1999

Related U.S. Application Data

(60) Provisional application No. 60/111,228, filed on Dec. 7, 1998.

(51) Int. Cl.[7] ............................................. G11B 5/725
(52) U.S. Cl. ................................ 428/421; 428/694 TF; 428/900; 428/447
(58) Field of Search ..................... 428/336, 421, 428/447, 694 TF, 900

(56) References Cited

U.S. PATENT DOCUMENTS

| | | | |
|---|---|---|---|
| 3,778,308 A | 12/1973 | Roller et al. | 117/234 |
| 3,810,874 A | 5/1974 | Mitsch et al. | 260/75 H |
| 4,069,360 A | 1/1978 | Yanagisawa et al. | 428/64 |
| 4,085,137 A | 4/1978 | Mitsch et al. | 260/561 HL |
| 4,120,995 A | 10/1978 | Phipps et al. | 427/248 |
| 4,152,487 A | 5/1979 | Yanagisawa | 428/621 |
| 4,268,556 A | 5/1981 | Pedrotty | 428/65 |
| 4,307,156 A | 12/1981 | Yanagisawa | 428/623 |
| 4,431,703 A * | 2/1984 | Somezawa et al. | 428/447 |
| 4,578,299 A | 3/1986 | Kato et al. | 428/65 |
| 4,647,413 A | 3/1987 | Savu | 260/544 F |
| 4,696,845 A | 9/1987 | Yanagisawa | 428/64 |
| 4,735,848 A | 4/1988 | Kondo et al. | 428/219 |
| 4,761,316 A | 8/1988 | Ogawa | 428/64 |
| 4,849,305 A | 7/1989 | Yanagisawa | 428/695 |
| 4,897,211 A | 1/1990 | Dekura et al. | 252/54 |
| 4,960,609 A * | 10/1990 | Houola et al. | 427/38 |
| 4,992,316 A | 2/1991 | Ogawa | 428/64 |
| 5,493,044 A | 2/1996 | Schwindeman | 556/471 |
| 5,820,964 A | 10/1998 | Nakakawaji et al. | 428/65.4 |
| 5,962,141 A * | 10/1999 | Falcone | 428/422 |

FOREIGN PATENT DOCUMENTS

| | | | |
|---|---|---|---|
| JP | 63-293719 | | 11/1988 |
| JP | 04-253985 | * | 9/1992 |
| JP | 11-29585 | * | 2/1999 |

* cited by examiner

*Primary Examiner*—Stevan A. Resan
(74) *Attorney, Agent, or Firm*—McDermott, Will & Emery

(57) ABSTRACT

A fluoropolyether having a nonfunctional silane end group is applied to a magnetic recording medium to form a lubricant topcoat thereon. In an embodiment of the present invention, no less than about 70% of the lubricant applied to the magnetic recording medium forms a bonded topcoat thereto.

2 Claims, 3 Drawing Sheets

SILANE DERIVATIZED LUBRICANTS FOR MAGNETIC RECORDING MEDIA

CROSS-REFERENCE TO RELATED APPLICATION

This application claims priority from provisional patent application Ser. No. 60/111,228 filed Dec. 7, 1998, entitled "SILANE DERIVATIZED LUBRICANTS FOR IMPROVED BONDING TO CARBON OVERCOATS OF THIN FILM MAGNETIC MEDIA" the entire disclosure of which is herein incorporated by reference.

FIELD OF THE INVENTION

The present invention relates to a magnetic recording medium, particularly a rotatable magnetic recording medium, such as a thin film magnetic disk and a lubricant topcoat for contact with a cooperating magnetic transducer head. The invention has particular applicability to a textured magnetic recording medium comprising a lubricant topcoat that adheres to the magnetic recording medium.

BACKGROUND OF THE INVENTION

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

A typical longitudinal recording medium is depicted in FIG. 1 and comprises a substrate 10, typically an aluminum (Al)-alloy, such as an aluminum-magnesium (Al—Mg)-alloy, plated with a layer of amorphous nickel-phosphorus (NiP). Alternative substrates include glass, glass-ceramic materials and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', and a lubricant topcoat 14, 14'. Cr underlayer 11, 11' can be applied as a composite comprising a plurality of sub-underlayers 11A, 11A'.

The protective overcoat desirably possesses high durability, density and hardness to protect the underlying magnetic layer providing wear resistance and encouraging durability of the magnetic recording medium arrangement. Typically, a thin film of zirconium oxide, silicon oxide or carbon is used as a protective overcoat.

Chromium underlayer 11, 11', Co-base alloy magnetic layer 12, 12' and protective overcoat 13, 13' are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Conversely, excess lubricant at the head-disk interface causes high stiction between the head and disk. If stiction is excessive, the drive cannot start and, likewise, catastrophic failure occurs.

The drive towards ever increasing recording density, and faster data transfer rates and the resulting smoother disk surfaces and lower flying heights, has served as an impetus for the development of new lubricants to serve as a lubricating topcoat overlying the protective overcoat. Such lubricants must perform a variety of different purposes requiring diverse characteristics and attributes. For example, the lubricant forming the topcoat is preferably chemically inert, possesses a low vapor pressure, low surface tension, high thermal stability, stability under high shear stress and good boundary lubrication properties. Moreover, it is critical that the lubricant tightly adheres to the underlying surface over the lifetime of the magnetic recording media.

Several classes of lubricants may satisfy many of the desired properties. Among the many lubricants available, liquid perfluoropolyethers (PFPE) are the most utilized for forming topcoat lubricants on magnetic recording media. PFPE's have been reported for use as lubricating magnetic media in, for example, U.S. Pat. No. 3,778,308. However, there continues to be a need to improve the adhesion of lubricants to the magnetic media while maintaining the desired tribological properties.

It is believed that to achieve adhesion of the lubricant to the magnetic media requires the inclusion of polar and reactive functional groups, particularly on the end of the lubricating compound. In this regard, several patents have disclosed the use of functionalized PFPE for improved bonding of the lubricant to the magnetic media. For example, U.S. Pat. No. 4,069,360 discloses magnetic storage means containing a lubricant which consists of an oil group, such as silicon oil, and a reactive surface coupling end group, such as a chlorosilane or a disilazane. U.S. Pat. No. 4,120,995 discloses a process for bonding a polymeric coating to a metal or oxide surface including treating the surface with a polymer having a reactive siloxane, halosilane or cyanosilane end group. U.S. Pat. No. 4,268,556 discloses lubricating magnetic recording disks with fluorinated telechelic polyether polymers containing highly polar end-groups. U.S. Pat. No. 4,696,845 discloses a lubricant layer for a magnetic surface, having fictional groups at various locations on the lubricant molecule and U.S. Pat. No. 5,820,964 discloses a lubricant film comprising an adhesion enhancing layer and a lubricating agent which, together, form a salt complex on a magnetic disk.

Other functional perfluoropolyether compounds are known. U.S. Pat. No. 3,810,874 discloses the preparation of polyfunctional-terminated poly(perfluoroalkylene oxide) materials. U.S. Pat. No. 4,085,137 discloses polyfunctional poly(perfluoroalkylene oxide) compounds containing polymerizable functional end groups. While lubricants including polar or functional end-groups have improved adhesion under certain conditions, many of these functional lubricants compromise the stability and durability of the lubricant topcoat over time.

In view of the criticality of the lubricant topcoat in magnetic recording media, there is a continuing need for improved uniform bonding of the lubricant topcoat to the magnetic recording medium, particularly to a protective overcoat while maintaining or improving the diverse characteristics and attributes desirable in lubricant topcoats. There is also a need for improved lubricants for use as topcoats in the manufacture of magnetic recording media capable of achieving a high bonding to the underlying protective overcoat.

SUMMARY OF THE INVENTION

An advantage of the present invention is a magnetic recording medium comprising a uniform lubricant topcoat substantially bonded to the magnetic recording medium.

Another advantage of the present invention is a method of manufacturing a magnetic recording medium comprising forming a uniform lubricant topcoat that tightly adheres to the magnetic recording medium.

A further advantage of the present invention is a lubricant useful as a lubricant topcoat on a magnetic recording medium capable of tightly adhering to a magnetic recording medium.

Additional advantages and other features of the invention will be set forth in part in the description which follows and in part will become apparent to those having ordinary skill in the art upon examination of the following or may be learned from the practice of the invention. The advantages of the invention may be realized and obtained as particularly pointed out in the appended claims.

According to the present invention, the foregoing and other advantages are achieved in part by a magnetic recording medium comprising a lubricant topcoat, wherein the lubricant topcoat comprises a fluoropolyether having a non-functional end-group. The lubricant topcoat of the present invention comprises a fluoropolyether having a non-functional silane end group, which advantageously achieves no less than 70% bonding to the magnetic recording medium. The inventive lubricants additionally can achieve the formation of highly uniform topcoats, as evidenced by measured water contact angles of in excess of about 100 degrees.

Embodiments of the present invention include a fluoropolyether having the following formula:

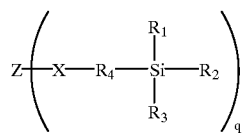

wherein Z is a fluoropolyether; X is a linker group, if present; $R_1$, $R_2$, and $R_3$ are independently alkyl or aryl; $R_4$ is a substituted or unsubstituted alkylene or arylene; and q is 1 to 4.

Another aspect of the present invention is a method of manufacturing a magnetic recording medium. The method comprises: forming a magnetic layer on a non-magnetic substrate; and forming a lubricant topcoat on the magnetic layer, wherein the lubricant topcoat comprises a fluoropolyether having a non-functional silane end group. Embodiments include means for lubricating the magnetic layer, wherein the lubricating means comprises a fluoropolyether having a nonfunctional silane end group and bonding about 70% or more of the fluoropolyether to the magnetic layer. The method further comprises: forming an underlayer on the non-magnetic substrate; forming the magnetic layer on the underlayer, forming a protective overcoat on the magnetic layer; and forming the lubricant topcoat on the protective overcoat. In an embodiment of the present invention, the protective overcoat comprises a carbon containing layer and about 90% or more of the fluoropolyether is bound to the carbon layer.

Additional advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The following detailed description of the embodiments of the present invention can best be understood when read in conjunction with the following drawings, wherein.

DESCRIPTION OF THE INVENTION

Figure 1:
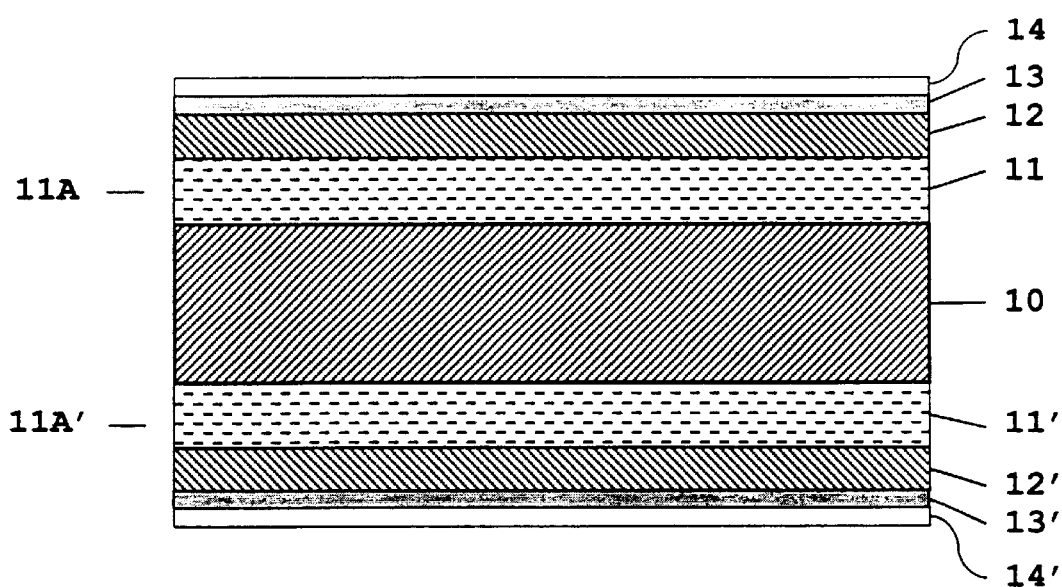
FIG. 1 schematically depicts, in cross-sectional view, a portion of a magnetic recording medium arrangement to which the present invention is applicable.

The present invention stems from the surprising discovery that certain fluoropolyether compounds having a nonfunctional end-group, when used as lubricant topcoats, lead to unexpected and considerable improvements in the performance of the magnetic media. The inventors recognized that conventional PFPE lubricants employed as topcoats for magnetic recording media do not have optimal properties conducive for tightly adhering and uniformly assembling topcoat lubricant on to magnetic recording media surfaces.

Accordingly, the present invention is directed to a class of lubricants that form highly uniform and tightly bound lubricant topcoats on magnetic recording media.

A particularly advantageous characteristic of the inventive class of lubricants is a high affinity for carbon, as a result of which the lubricant strongly interacts and remains on the surface of carbon-containing protective overcoats. Consequently, the lubricant topcoat of the present invention desirably reduces stiction and increases wear resistance and durability of a magnetic medium by its high affinity for the protective overcoat.

Lubricant topcoats of the present invention comprise a fluoropolyether having a nonfunctional silane end-group. As employed herein, a nonfunctional silane end-group is such that the silane end-group does not readily undergo hydrolysis or condensation-type reactions. For example a nonfunctional silane end-group excludes a Si—X type of bond, where X is an oxygen, halide, nitrogen or a cyano group. Hence, a functional silane is one that readily undergoes hydrolysis or condensation-type reactions, such fictional silanes include a siloxane, silanol, silyl ether, silylhalide, or silazane.

Fluoropolyether lubricants having a nonfunctional silane end-group of the forgoing have the following formula:

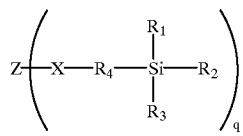

wherein Z is a fluoropolyether;

X is a linker group, if present, (e.g. X can be —O—, —S—, —C(O)—, —C(O)O—, —C(O)S——C(O)NR—, —C(S)—, —C(S)O—, —C(S)S—, —C(S)NR—, where R is hydrogen, alkyl or an aryl group);

$R_1$, $R_2$, and $R_3$ are independently an alkyl group, such as a $C_{1-16}$ alkyl group, or an aryl group;

$R_4$ is a substituted or unsubstituted alkylene or arylene; and q is 1 to 4.

An embodiment of the fluoropolyether lubricant having a nonfunctional silane is given by the following formula:

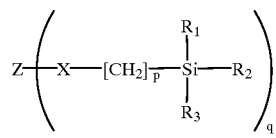

wherein Z is a fluoropolyether;

X is a linker group, if present;

$R_1$, $R_2$, and $R_3$ are independently alkyl or aryl;

p is 0 to 10; and q is 1 to 4.

Fluoropolyethers having a nonfunctional silane end-group of the present invention include homopolymers, random polymers or block polymers, i.e. the repeating units of the fluoropolyether, Z, may be the same or different. In addition, different repeat units of Z can be randomly distributed along the backbone of the polymer or distributed as a block of one type of repeat unit and subsequent blocks of different repeat units along the backbone of the polymer. The inventive lubricants can be completely fluorinated or partially fluorinated and can be linear or branched. In an embodiment of the present invention, Z is a perfluoropolyether comprising a plurality of —$(C_aF_{2a}O)_n$—repeating units, wherein subscript a is independently in each such unit an integer of from 1 to about 10 and n is an integer from 1 to about 100.

A fluropolyether having a silane terminal group of the present invention can be formed, for example, by derivatizing a variety of commercially available fluoropolyether lubricants, such as those conventionally employed to form lubricant topcoats on magnetic recording media The inventive lubricants can be prepared, for example, by combining a perfluoropolyether having a terminal carboxylic acid on either end with, for example, an aminoalkylsilane to yield a perfluoropolyether silane terminated lubricant of the present invention having the following structure:

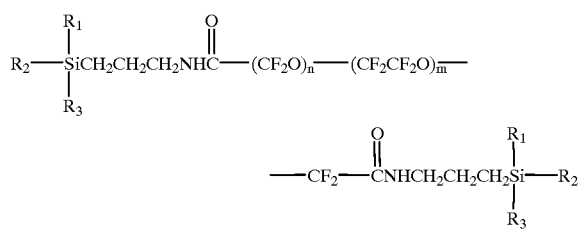

wherein n and m are independently an integer from 1 to about 100 and $R_1$, $R_2$, and $R_3$ are independently a lower alkyl group, e.g., a branched or linear $C_{1-6}$ such as methyl, ethyl, propyl, isopropyl, t-butyl, pentyl, hexyl, octyl, lauryl, etc. groups, and the ratio of n to m is about one. Typically, n and m are about 5 to about 30.

Another example of a lubricant of the present invention is provided by the following structure:

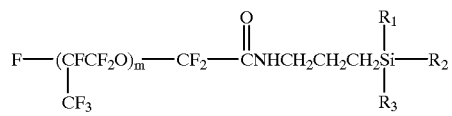

wherein m is an integer from 1 to about 100 and $R_1$, $R_2$, and $R_3$ are independently a lower alkyl group, e.g. a $C_{1-6\ group}$, such as a branched or linear $C_{1-8}$ group. Typically, m is about 10 to about 60. Commercial perfluoropolyether carboxylic acids are available in various molecular weights ranging from over about 100 to about 10,000 number average molecular weight.

The lubricants of the present invention can be applied to a magnetic recording medium in any convenient manner, as by dip coating the medium in a solution of the lubricant in a conventional organic solvent. The lubricant topcoat of the present invention can be applied to a magnetic recording medium, either on the magnetic layer or on a conventionally applied protective overcoat, particularly a carbon overcoat. In an embodiment of the present invention, the lubricant is dissolved in a conventional solvent, such as Freon, Vertrel XF or perfluorohexane (solvents available from Dupont), in a ratio of about 0.0001% to about 100% by (weight/weight), e.g. about 0.001% to about 1%. A typical magnetic recording medium, for example, a composite comprising a non-magnetic substrate having sequentially deposited on each side thereof an underlayer, a magnetic layer, and a protective carbon overcoat, is submerged in the lubricant solution and then slowly withdrawn therefrom. In practicing the present invention, one can employ a conventional lifter-type dipper to submerge the composite in the lubricant solution. One having ordinary skill in the art can easily optimize the duration of submergence and the speed of withdrawal to achieve a desired coating thickness.

Surprisingly, it was found that the lubricants of the present invention characteristically form a uniformly bonded topcoat, as evidenced by a water contact angle measurement in excess of 100 degrees. It was further unexpectedly discovered that lubricants of the present invention exhibit a strong interaction with the underlying protective overcoat, as evidence by a substantial amount, e.g. greater than about 70%, of the originally applied lubricant of the present invention adhering to the protective overcoat. Although the mechanism of adherence of the lubricant is not completely understood, a bonded lubricant can be defined as the amount of original lubricant remaining on the surface of the magnetic recording medium after immersion of the recording medium in a solvent capable of dissolving the lubricant. The nonbonded lubricant is that portion which is easily removed upon immersion in the solvent.

EXAMPLES

A fractionated Fomblin Z lubricant obtained from Ausimont (Thorofare, N.J.), having a number average molecular weight of about 4,500 was derivatized to the following fluoropolyether non-functional silane terminated lubricant:

where each of n and m are from about 10 to about 60.

A krytox lubricant obtained from DuPont (Newark, Del.) was derivatized to yield following silane terminated lubricant:

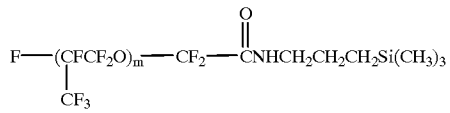

where m is from about 10 to about 60.

Both the Fomblin derivatized lubricant and the krytox derivatized lubricant were applied to thin film magnetic media having a carbon protective overcoat using a dip-coat technique.

The lubricants were dissolved in Vertrel XF solvent (DuPont) at about 0.1% by weight to form a solution of the lubricant in the solvent. The lubricants were then applied to the thin film media by dipping the media in the solution and slowly withdrawing the media from the solution to yield a topcoat of the lubricant on the magnetic medium.

The thickness of the lubricant topcoat on the media was controlled by varying the rate of withdrawal and/or solution concentration to yield thicknesses in the range of about 5 Å to about 30 Å. The thicknesses were measured by Fourier Transform Infrared Spectroscopy (FTIR), which has an error on the order of about 1 Å.

Figure 2:
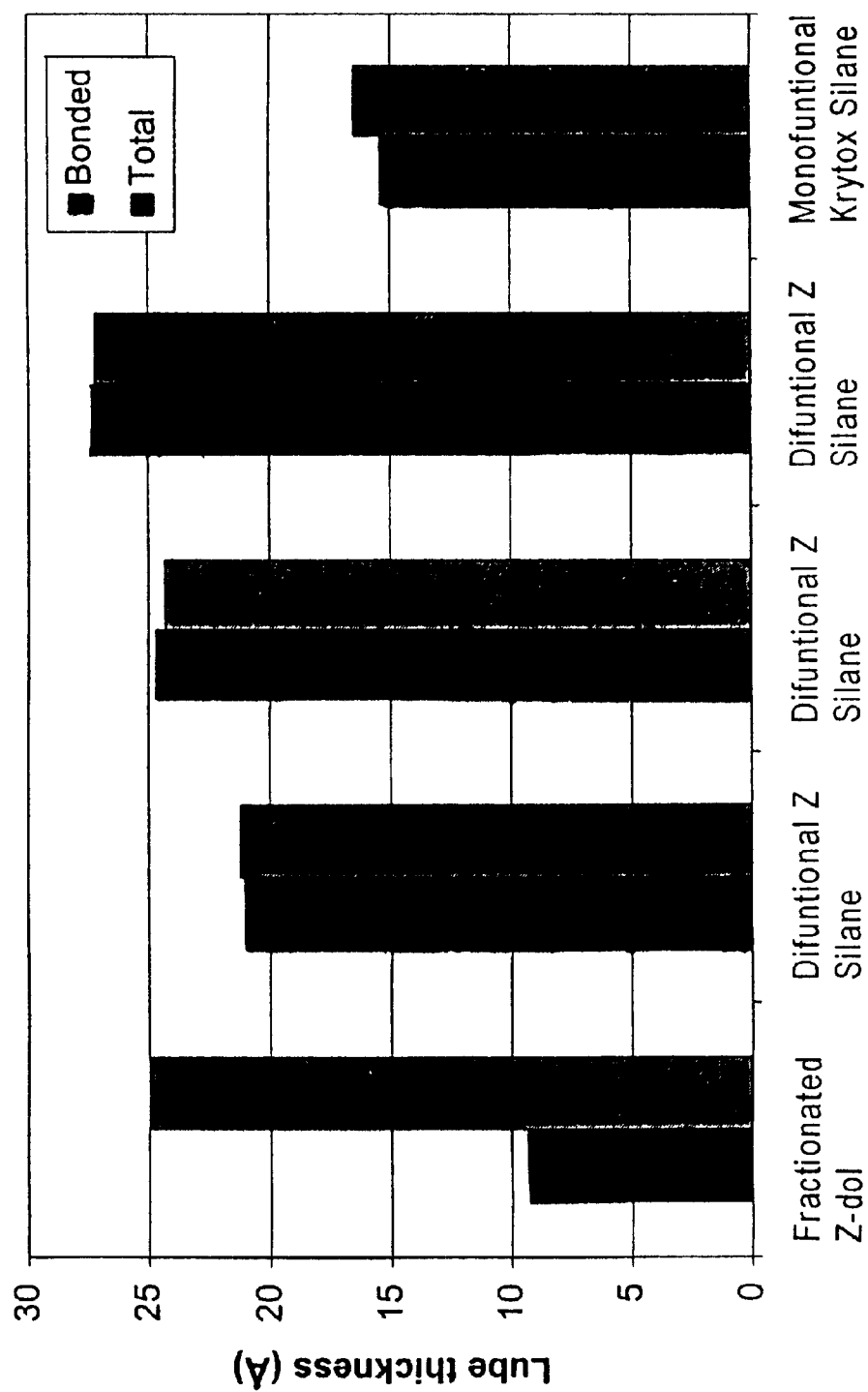
FIG. 2 graphically illustrates the bonding achieved with lubricants of the present invention compared to a conventional lubricant.

As a comparison to the inventive lubricants, fractionated Fomblin Z-DOL, a conventional lubricant, having a number average molecular weight of 5500 Daltons was also dip coated on the same type of media under the same experimental conditions. A relative bonding comparison between the inventive lubricants to the conventional lubricant was then analyzed by a standardized wash-off procedure. This procedure involves a two minute vapor degrease of the lubricated disks using the Vertrel XF solvent. The lubricant remaining on the thin film media after such wash-off is defined as the bonded lubricant. FIG. 2 illustrates the results of the amount of lubricant remaining, in angstroms, after the wash-off procedure for the conventional Z-Dol lubricant compared to lubricants of the present invention. As shown in FIG. 2, a fluoropolyether silane lubricant derived from Fomblin exhibited about 100% (within experimental error) bonding to a protective carbon containing overcoat at all three initial thicknesses. The fluoropolyether silane terminated lubricant of the present invention derived from krytox exhibited more than about 90% bonding. In contrast, the conventional Fomblin Z-DOL exhibited only 35% bonding to the magnetic media.

In addition to the bonding of a lubricant to the magnetic media, water contact angle measurements are often used to characterize how well a lubricant covers the surface to which it is applied. Without being bound to any theory, it is believed that higher water contact angles (e.g. greater then about 100 degrees) are indicia of a more hydrophobic surface and, thus, represent a more uniform coverage of the lubricant on the magnetic media Hydrophobic surfaces are desirable because it is believed that hydrophobic surfaces aid in preventing corrosion of the thin film magnetic media under conditions of high humidity.

Figure 3:
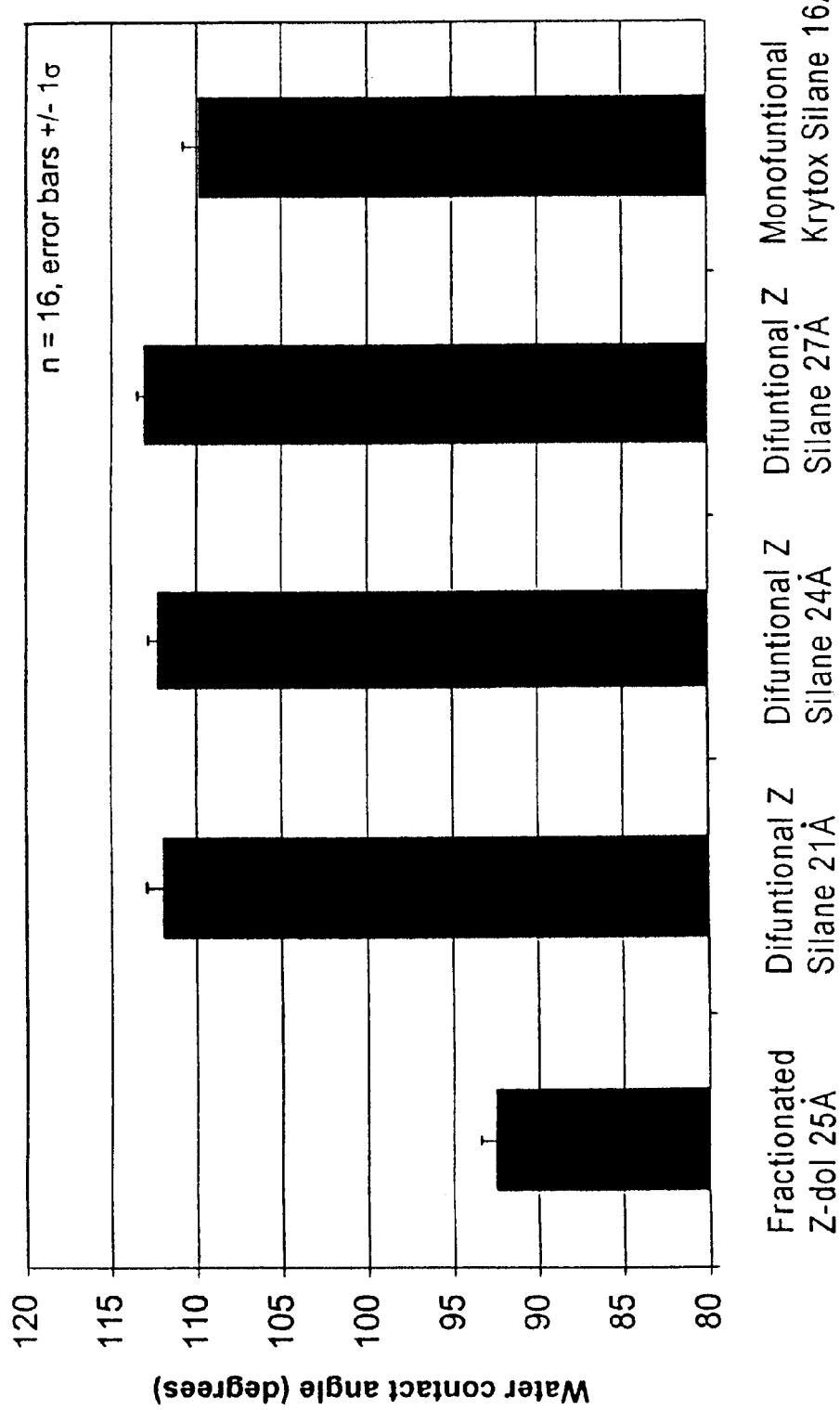
FIG. 3 graphically shows the uniformity achieved with lubricant topcoats formed by lubricants of the present invention compared to a conventional lubricant.

Water contact angle measurements were performed on lubricant topcoats of the present invention and compared to a lubricant topcoat of a conventional lubricant. As shown in FIG. 3, the water contact angles for five lubricant topcoats of the present invention are all over about 110°. In contrast, a conventional Z-DOL formed topcoat has a contact angle of only 93°.

The present invention is not limited to any particular type of magnetic recording medium, but can be employed in any of various magnetic recording media, including those wherein the substrate or a subsequently deposited base layer has been textured, as by mechanical treatment or by laser techniques, and the textured surface substantially reproduced on subsequently deposited layers. Thus, a lubricant prepared in accordance with the present invention, can be applied to form a lubricant topcoat, such as topcoat 14 and 14' on the magnetic recording media depicted in FIG. 1, but is not necessarily limited thereto.

Only the preferred embodiment of the present invention and an example of its versatility is shown and described in the present disclosure. It is to be understood that the present invention is capable of use in various other combinations and environments and is capable of changes or modifications within the scope of the inventive concept as expressed herein.

What is claimed is:

1. A magnetic recording medium comprising a lubricant topcoat, wherein the lubricant to coat comprises a fluoropolyether having the following formula;

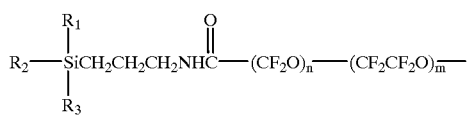
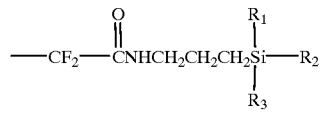
wherein n and m are independently an integer from 1 to about 100 and $R_1$, $R_2$, and $R_3$ are independently an alkyl group.
2. A magnetic recording medium comprising a lubricant topcoat, wherein the lubricant topcoat comprises a fluoropolyether having the following formula:
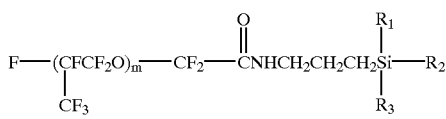
wherein m is an integer from 1 to about 100 and $R_1$, $R_2$, and $R_3$ are independently alkyl group.
* * * * *